United States Patent
Shibata et al.

(10) Patent No.: US 10,412,239 B1
(45) Date of Patent: Sep. 10, 2019

(54) IMAGE FORMING APPARATUS AND MANAGEMENT SYSTEM

(71) Applicant: KYOCERA Document Solutions Inc., Osaka (JP)

(72) Inventors: Yukihiro Shibata, Osaka (JP); Akira Ohashi, Osaka (JP); Yusuke Okazaki, Osaka (JP); Satoshi Sato, Osaka (JP); Yuki Yamamoto, Osaka (JP); Koji Tagaki, Osaka (JP)

(73) Assignee: KYOCERA Document Solutions Inc., Osaka (JP)

(*) Notice: Subject to any disclaimer, the term of this patent is extended or adjusted under 35 U.S.C. 154(b) by 0 days.

(21) Appl. No.: 16/351,697

(22) Filed: Mar. 13, 2019

(30) Foreign Application Priority Data

Mar. 22, 2018 (JP) .................................. 2018-054622

(51) Int. Cl.
*H04N 1/00* (2006.01)

(52) U.S. Cl.
CPC ....... *H04N 1/00323* (2013.01); *H04N 1/0097* (2013.01); *H04N 1/00344* (2013.01); *H04N 1/00405* (2013.01); *H04N 1/00925* (2013.01); *H04N 2201/0094* (2013.01)

(58) Field of Classification Search
CPC ........... H04N 1/00323; H04N 1/00344; H04N 1/00405; H04N 1/00925; H04N 1/0097; H04N 2201/0094
See application file for complete search history.

(56) References Cited

U.S. PATENT DOCUMENTS

2014/0333949 A1* 11/2014 Mamiya ................ G06F 1/3231
                                                                                   358/1.13
2017/0244856 A1*  8/2017 Narushima ........... G06F 1/3231

FOREIGN PATENT DOCUMENTS

JP          2013-230688 A    11/2013

* cited by examiner

*Primary Examiner* — Quang N Vo
(74) *Attorney, Agent, or Firm* — Studebaker & Brackett PC

(57) ABSTRACT

An image forming apparatus includes a sensor, an operation section, a controller, and a communication section. The sensor detects a sensor target. The operation section receives an operation instruction. The controller adjusts a sensitivity level of the sensor. The communication section transmits an instruction signal and a reception signal to an external device and receives an adjustment instruction from the external device. The instruction signal indicates an instruction for sensitivity level adjustment for the sensor. The adjustment instruction is an instruction as to whether or not to adjust the sensitivity level based on the instruction signal and the reception signal. The reception signal includes first information indicating time of detection signal reception by the controller receives the detection signal within a specific time period and second information indicating whether the operation section receives the operation instruction. The controller adjusts the sensitivity level of the sensor according to the adjustment instruction.

7 Claims, 5 Drawing Sheets

IMAGE FORMING APPARATUS AND MANAGEMENT SYSTEM

INCORPORATION BY REFERENCE

The present application claims priority under 35 U.S.C. § 119 to Japanese Patent Application No. 2018-054622, filed on Mar. 22, 2018. The contents of this application are incorporated herein by reference in their entirety.

BACKGROUND

The present disclosure relates to an image forming apparatus and a management system.

Recently, image forming apparatuses have a function to be set to a power saving state in which for example power sources for some of devices included therein are turned off (also referred to below as a sleep operation mode) in order to reduce power consumption. However, in a situation in which a user uses such an image forming apparatus in the sleep operation mode, it takes a waiting time to return the mode of the image forming apparatus from the sleep operation mode to a normal operation mode through touch panel input or key input. A technique using a motion sensor as described below is proposed to reduce the waiting time.

An image forming apparatus stores a detection state of the motion sensor for a specific period and a state of a user using the image forming apparatus and changes sensitivity of the motion sensor. When the motion sensor is used, a detection error resulting in reversion to the normal operation mode from the sleep operation mode may occur due to a person who does not use the image forming apparatus approaching the image forming apparatus, besides detection resulting in normal reversion to the normal operation mode from the sleep operation mode due to a user approaching the image forming apparatus. A technique to change sensitivity of the motion sensor is proposed to solve the above problem.

SUMMARY

An image forming apparatus according to the present disclosure includes a sensor, an operation section, a controller, and a communication section. The sensor detects a sensor target. The operation section receives an operation instruction. The controller adjusts a sensitivity level of the sensor. The communication section transmits an instruction signal and a reception signal to an external device and receives an adjustment instruction to the external device. The instruction signal indicates an instruction for sensitivity level adjustment for the sensor. The adjustment instruction is an instruction as to whether or not to adjust the sensitivity level based on the instruction signal and the reception signal. The reception signal indicates first information and second information. The first information indicates time of detection signal reception by the controller within a specific period. The second information indicates whether or not the operation section receives the operation instruction. The detection signal indicates detection of the sensor target by the sensor. The controller adjusts the sensitivity level of the sensor according to the adjustment instruction. The sensitivity level is a level of sensitivity for the sensor target.

An management system according to the present disclosure includes an image forming apparatus and a management server. The image forming apparatus includes a sensor, a first operation section, a first controller, and a first communication section. The sensor detects a sensor target. The first operation section receives an operation instruction. The first controller adjusts a sensitivity level of the sensor. The first communication section transmits an instruction signal and a reception signal to the management server and receives an adjustment instruction from the management server. The instruction signal indicates an instruction for sensitivity level adjustment for the sensor. The adjustment instruction is an instruction as to whether or not to adjust the sensitivity level based on the instruction signal and the reception signal. The reception signal includes first information and second information. The first information indicates time of detection signal reception by the controller within a specific period. The second information indicates whether or not the operation section receives the operation instruction. The detection signal indicates detection of the sensor target by the sensor. The first controller adjusts the sensitivity level of the sensor according to the adjustment instruction. The sensitivity level is a level of sensitivity for the sensor target. The management server includes a second communication section, a second operation section, and a second controller. The second communication section receives the instruction signal and the reception signal from the image forming apparatus. The second operation section receives input of the adjustment instruction in response to the reception signal. The second controller controls the second communication section to transmit the adjustment instruction to the first communication section.

DETAILED DESCRIPTION

Figure 1:
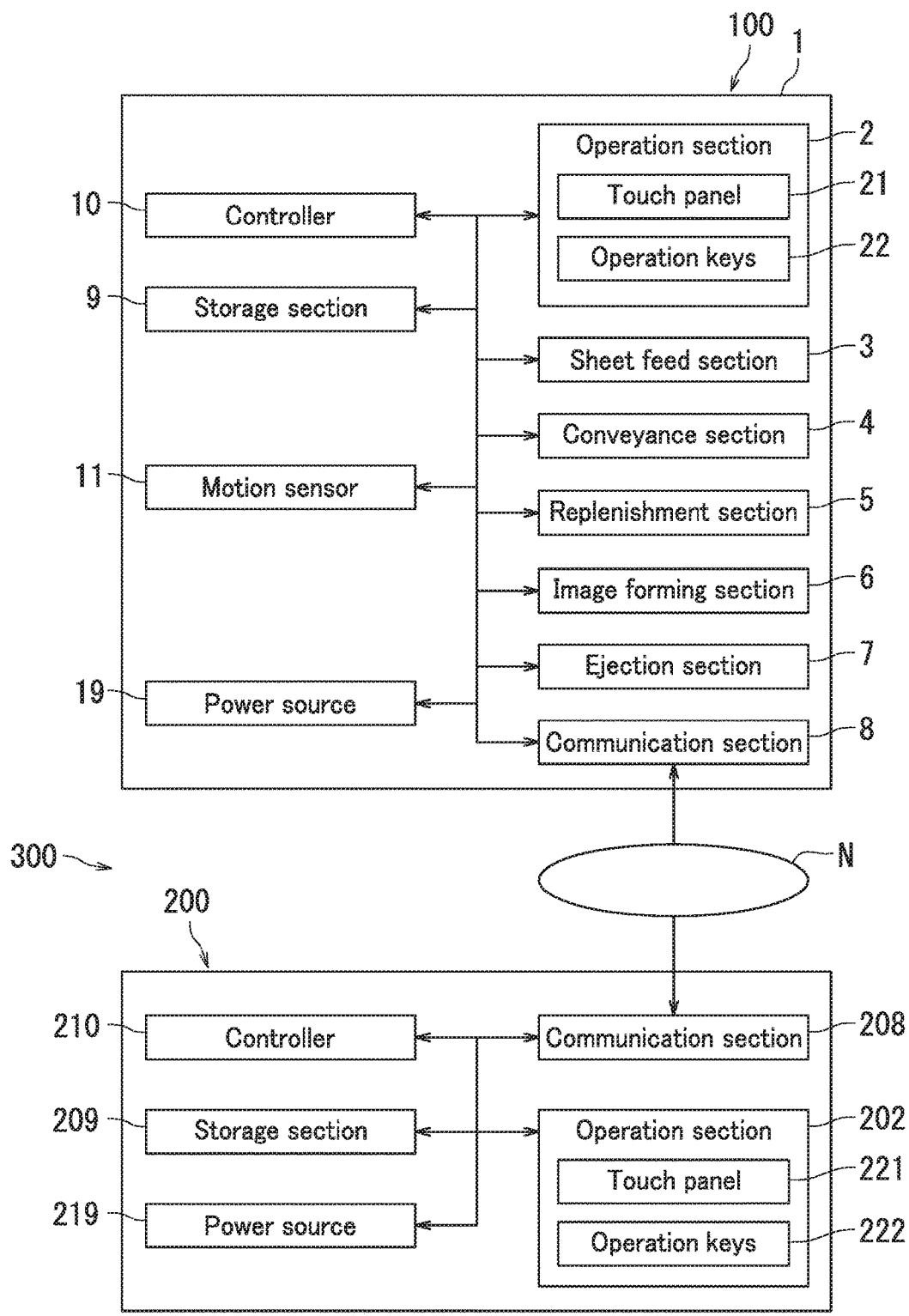
FIG. 1 is a block diagram illustrating a configuration of an image forming apparatus according to an embodiment of the present disclosure.

The following describes a management system including an image forming apparatus and a management server according to an embodiment of the present disclosure with reference to the accompanying drawings. It should be noted that elements in the drawings that are the same or equivalent are labeled using the same reference signs and description thereof is not repeated.

Respective configurations of an image forming apparatus 100 and a management server 200 according to the embodiment of the present disclosure will be described with reference to FIG. 1. The image forming apparatus 100 and the management server 200 constitute a management system 300. The image forming apparatus 100 is a multifunction peripheral in the embodiment of the present disclosure and forms monochrome images.

The image forming apparatus 100 includes a casing 1, an operation section 2, a sheet feed section 3, a conveyance section 4, a replenishment section 5, an image forming section 6, an ejection section 7, a communication section 8, a storage section 9, a controller 10, a motion sensor 11, and a power source 19.

The operation section 2 receives an operation instruction. For example, the operation section 2 receives the operation instruction to the image forming apparatus 100 from a user.

Upon receiving the operation instruction from the user, the operation section 2 generates an operation signal indicating a content of the operation instruction from the user.

The operation section 2 includes a touch panel 21 and a plurality of operation keys 22. The touch panel 21 includes a display and a touch sensor.

The display displays various screens. The various screens include a standby screen and a service screen. The standby screen includes for example a menu button for receiving instructions to execute various processes. The service screen is for example a screen for setting change of the image forming apparatus 100. The display is a liquid-crystal display or an organic electroluminescent (EL) display, for example.

The touch sensor detects a touch by a detection target. The touch sensor outputs a position signal indicating a position where a touch by the detection target is detected. The detection target is for example a finger of the user. The touch sensor is for example a resistive touch sensor.

The operation keys 22 include for example a numeric keypad, a start key, and a cancel key.

The sheet feed section 3 accommodates a plurality of sheets and feeds the accommodated sheets one at a time.

The conveyance section 4 conveys the fed sheet to the ejection section 7.

The replenishment section 5 replenishes the image forming section 6 with a consumable. The consumable is toner in the embodiment of the present disclosure.

The image forming section 6 performs image formation. Specifically, the image forming section 6 forms an image (toner image) on the sheet using the consumable. In the embodiment of the present disclosure, the image forming section 6 includes a light exposure device, a charger, a photosensitive drum, a development device, a cleaner, a transfer device, and a fixing device, which are not illustrated. The image forming section 6 forms images by electrophotography.

The ejection section 7 ejects the sheet with the toner image fixed thereto out of the casing 1 onto an exit tray through a sheet exit port.

The communication section 8 is capable of communicating with an electronic device including a communication device employing the same communication scheme (protocol) as that employed in the communication section 8. The communication section 8 in the embodiment of the present disclosure communicates with the management server 200 via a network N such as a local area network (LAN). The communication section 8 is for example a communication module (communication equipment) such as a LAN board.

The communication section 8 transmits an instruction signal and a reception signal to an external device, and receives an adjustment instruction from the external device. The instruction signal indicates an instruction for sensitivity level adjustment for the motion sensor 11. The adjustment instruction is an instruction as to whether or not to adjust the sensitivity level based on the instruction signal and the reception signal. The reception signal includes first information indicating time of detection signal reception by the controller 10 within a specific time period and second information indicating whether or not the operation section 2 receives the operation instruction. The sensitivity level is a level of sensitivity for a sensor target.

The storage section 9 stores therein various data. The storage section 9 stores therein for example values of the sensitivity level of the motion sensor 11. The storage section 9 includes a storage device and semiconductor memory. The storage device includes for example either or both a hard disk drive (HDD) and a solid state drive (SDD). The semiconductor memory includes for example random access memory (RAM) and read only memory (ROM). The storage section 9 stores control programs therein.

The storage section 9 in the embodiment of the present disclosure stores therein in advance a flag (advance notification flag) indicating whether or not to notify an administrator of setting change. The storage section 9 in the embodiment of the present disclosure stores the advance notification flag before shipment of the image forming apparatus 100. However, the advance notification flag may be stored in the storage section 9 according to a change instruction from the management server 200 after shipment.

The controller 10 adjusts the sensitivity level of the motion sensor 11. In a situation in which the advance notification flag of the storage section 9 is on, the controller 10 notifies the external device of setting change for the motion sensor 11. In a situation in which the advance notification flag is off, the controller 10 does not notify the external device of setting change for the motion sensor 11. The controller 10 includes a processor such as a central processing unit (CPU). The controller 10 also includes an integrated circuit for image formation. The integrated circuit for image formation is constituted by for example an application specific integrated circuit (ASIC). The controller 10 controls operations of the respective elements of the image forming apparatus 100 through execution of the control programs.

The controller 10 performs a setting process that the motion sensor 11 undergoes. The setting process that the controller 10 performs on the motion sensor 11 will be described later in detail with reference to FIGS. 2 to 4, 5A, and 5B.

The motion sensor 11 detects a sensor target. For example, when the motion sensor 11 detects a user approaching or leaving the image forming apparatus 100, the motion sensor 11 generates a detection signal indicating detection of the user and transmits the detection signal to the controller 10. The motion sensor 11 is an example of a "sensor".

The power source 19 supplies electric power to at least some of the elements constituting the image forming apparatus 100. The image forming apparatus 100 uses a normal operation mode and a sleep operation mode or a power saving mode. In the normal operation mode, electric power is supplied to each element constituting the image forming apparatus 100. In the sleep operation mode or the power saving mode, electric power is not supplied to some of the elements. The power source 19 transitions between the normal operation mode and the sleep operation mode according to a mode instruction from the controller 10. When the motion sensor 11 detects a user in a situation in which the power source 19 is in the sleep operation mode, the controller 10 outputs to the power source 19 the mode instruction to cause transition from the sleep operation mode to the normal operation mode, whereby the power source 19 is returned to the normal operation mode.

The management server 200 is a device that the administrator uses and functions as an external device. The management server 200 includes an operation section 202, a communication section 208, a storage section 209, a controller 210, and a power source 219.

The communication section 208 is capable of communicating with an electronic device including a communication section employing the same communication scheme (protocol) as that employed in the communication section 208.

For example, the communication section 208 receives the instruction signal and the reception signal from the image forming apparatus 100.

The operation section 202 includes a touch panel 221 and a plurality of operation keys 222. The touch panel 221 includes a display and a touch sensor. For example, the operation section 202 receives input of the adjustment instruction in response to the reception signal.

The storage section 209 stores therein various data. The storage section 209 includes a storage device and semiconductor memory.

The controller 210 includes a processor such as a CPU. For example, the controller 210 controls the communication section 208 to transmit the adjustment instruction to the communication section 8. The controller 210 controls operations of the respective elements of the management server 200 through execution of control programs.

The power source 219 supplies electric power to the respective elements constituting the management server 200.

The following describes the setting process that the motion sensor 11 undergoes with reference to FIGS. 1 to 4, 5A, and 5B.

Figure 2:
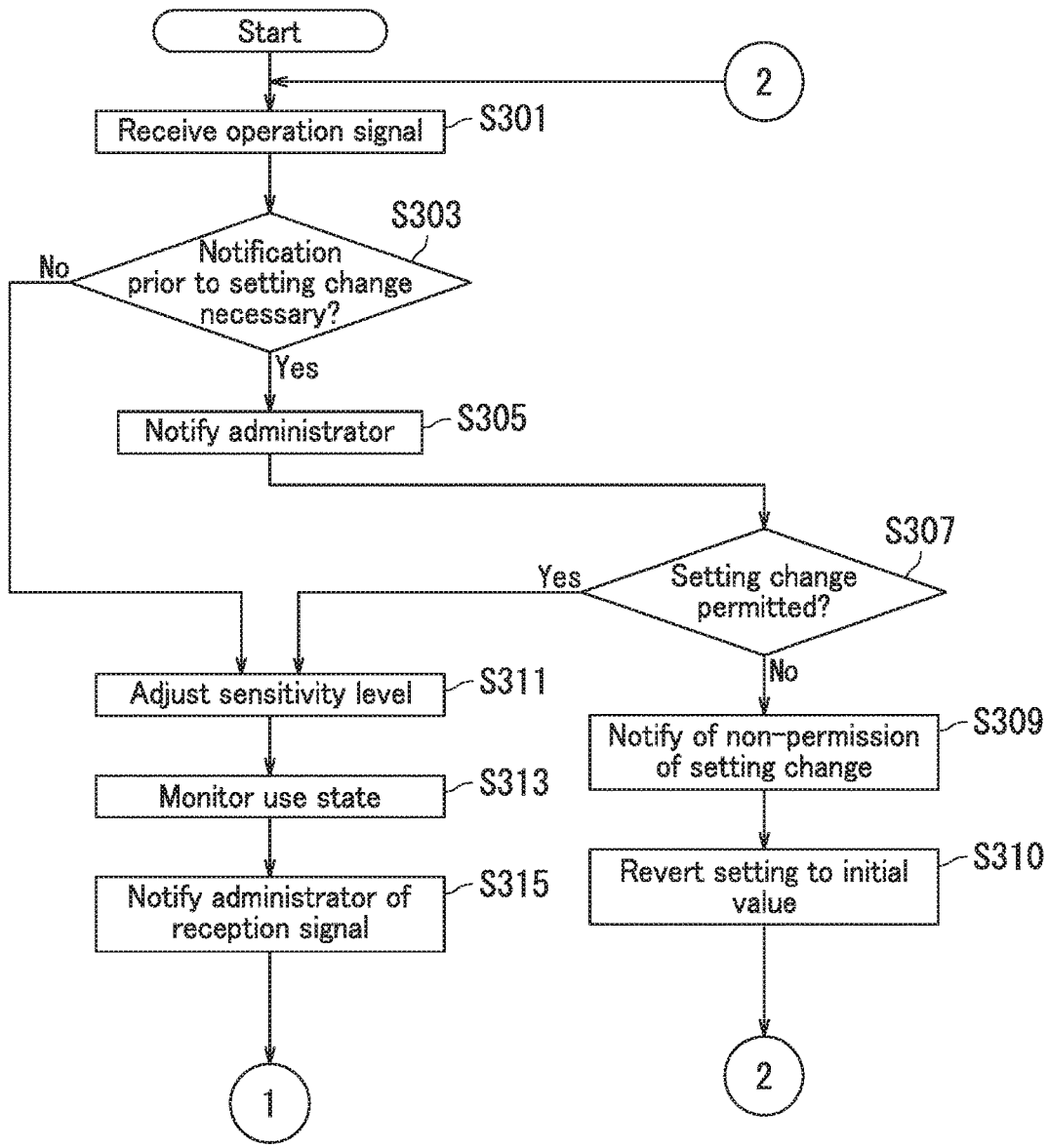
FIG. 2 is a flowchart depicting a portion of a setting process that a motion sensor undergoes.
Figure 3:
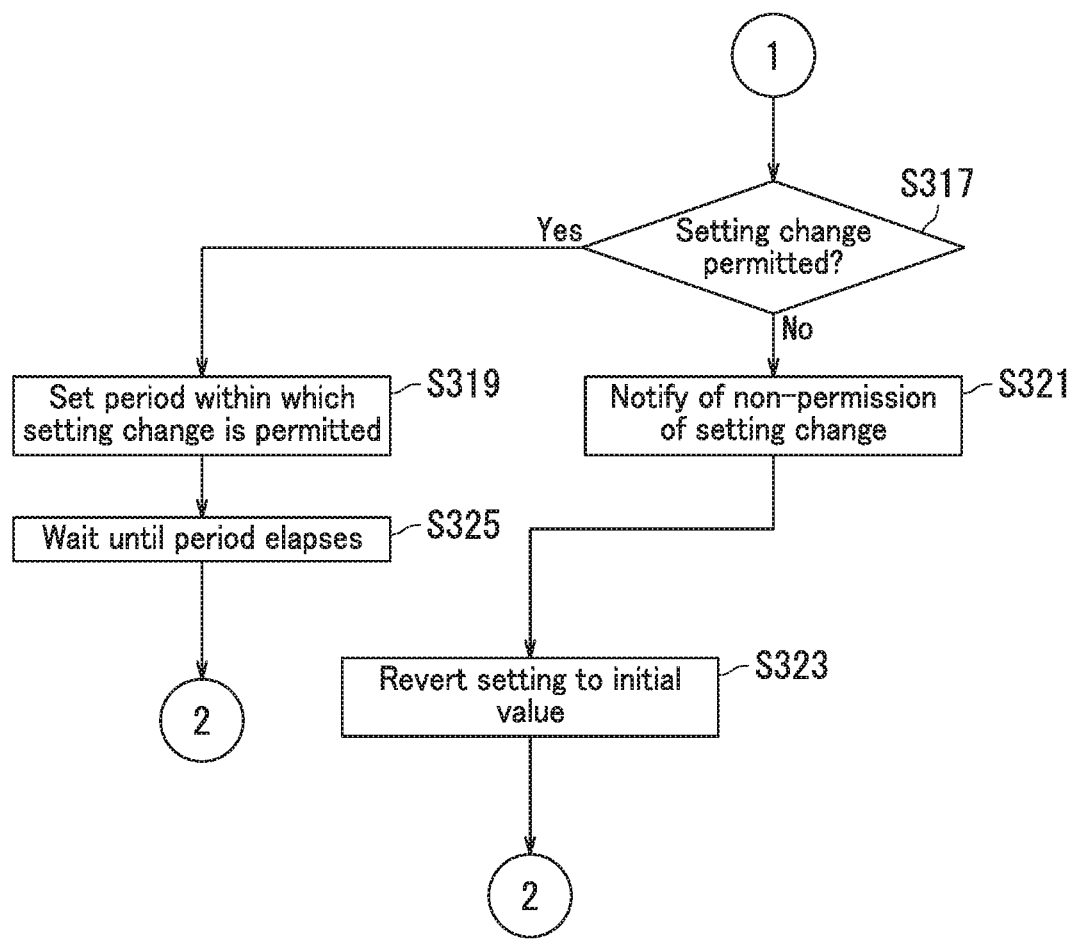
FIG. 3 is a flowchart illustrating a portion of the setting process that the motion sensor undergoes.

FIGS. 2 and 3 are flowcharts each depicting a portion of the setting process that the motion sensor 11 undergoes. The setting process that the motion sensor 11 undergoes is a process that the controller 10 sets the sensitivity level of the motion sensor 11 according to an instruction to set the sensitivity level of the motion sensor 11. For example, upon the image forming apparatus 100 is turned on, the controller 10 starts the setting process for the motion sensor 11.

Step S301: The controller 10 receives the operation signal. The controller 10 maintains the state in Step S301 until reception of the operation signal. The instruction signal indicates an instruction for sensitivity level adjustment for the motion sensor 11. The instruction signal includes a currently set sensitivity level of the motion sensor 11. When the user presses one of the operation keys 22 of the operation section 2, the controller 10 causes the display of the touch panel 21 to display a first notification screen G1 that invites setting change of the motion sensor 11 in the embodiment of the present disclosure. The first notification screen G1 will be described later with reference to FIG. 4. Note that the controller 10 generates the instruction signal according to user operation on the first notification screen G1 in the embodiment of the present disclosure. However, the instruction signal may be generated according to a specific program in the image forming apparatus 100.

Upon receiving an operation instruction indicating that pressing of a button for setting change permission (i.e., a YES button illustrated in FIG. 4) on the first notification screen G1 is detected, the controller 10 maintains a sensitivity level changed by the user through the first notification screen G1 as a sensitivity level under provisional setting. Then, the routine proceeds to Step S303. The provisional setting is an example of "provisional adjustment", and is a setting in which reversion of a current value of the sensitivity level to a value before adjustment is permitted (i.e., a setting by which change in sensitivity level is not established). Note that upon receiving an operation instruction indicating that pressing of a button for setting change cancelation (i.e., a NO button illustrated in FIG. 4) on the first notification screen G1 is detected, the controller 10 returns the value of the changed sensitivity level to a value before displayed on the first notification screen G1. Then, the routine remains in Step 301.

Step S303: The controller 10 determines whether or not notification prior to setting change to the administrator is necessary. In a situation in which the advance notification flag in the storage section 9 is on (Yes at Step S303), the routine proceeds to Step S305. In a situation in which the advance notification flag in the storage section 9 is off (No at Step S303), the routine proceeds to Step S311.

Step S305: The controller 10 notifies the administrator of the instruction signal. For example, the controller 10 notifies the management server 200 of the instruction signal via the communication section 8. Note that the administrator using the management server 200 may be notified of through an email in a specific format including a YES button and a NO button.

Step S307: The controller 210 of the management server 200 determines whether or not to permit the instructed setting change according to administrator input. Specifically, the communication section 208 of the management server 200 first receives the instruction signal and transmits the instruction signal to the controller 210. The controller 210 then causes the display of the touch panel 221 to display a second notification screen G2. The administrator determines whether or not to establish the instructed setting change of the motion sensor 11, while referencing the second notification screen G2, and inputs a result of the determination to the operation section 202. The second notification screen G2 will be described later with reference to FIG. 5A.

Upon receiving from the touch panel 221 an operation instruction indicating that pressing of a button for setting change permission (i.e., a Yes button illustrated in FIG. 5A) on the second notification screen G2 is detected (Yes in Step S307), the controller 210 of the management server 200 transmits the adjustment instruction to adjust the sensitivity level to the image forming apparatus 100 via the communication section 208. The controller 10 maintains the changed sensitivity level. Then, the routine proceeds to Step S311. Alternatively, when the controller 10 receives from the touch panel 221 an operation instruction indicating that pressing of a button for setting change cancelation (i.e., a NO button illustrated in FIG. 5A) is detected (No in Step S307), the routine proceeds to Step S309.

Step S309: The controller 210 of the management server 200 notifies the image forming apparatus 100 of non-permission of the instructed setting change. Specifically, the controller 210 transmits an adjustment instruction not to adjust the sensitivity level to the image forming apparatus 100 via the communication section 208. The routine proceeds to Step S310.

Step S310: The controller 10 returns the sensitivity level to a value initially set at a start. Specifically, the controller 10 returns a value of the sensitivity level changed in Step S301 to the value of the sensitivity level before the first notification screen G1 is displayed. Then the routine returns to Step S301.

Through execution of Step S303 to Step S310, the provisionally set sensitivity level can be returned to the initial value. As a result, a situation in which the sensitivity level of the motion sensor 11 is set too high or too low can be prevented.

Step S311: The controller 10 performs setting adjustment on the motion sensor 11. Specifically, the controller 10 sets the changed sensitivity level in the motion sensor 11.

Step S313: The controller 10 monitors a use state of the motion sensor 11. The controller 10 collects reversion time information during a unit period Ts in order to monitor the use state of the image forming apparatus 100. The reversion time information indicates time of reception by the controller 10 of the detection signal generated by the motion sensor 11 and time of reception by the controller 10 of the operation signal generated by the operation section 2. The unit period Ts is for example 30 minutes and is a time period from a start of the processing in Step S313 to time at which a specific period elapses. The unit period Ts is an example of a "specific period". The controller 10 stores the reversion time information in the storage section 9.

Step S315: The controller 10 notifies the administrator of the reception signal. As described with reference to FIG. 1, the reception signal indicates the first information indicating time of detection signal reception by the controller 10 within the unit period Ts and the second information indicating whether or not the operation section 2 receives the operation instruction. Specifically, the controller 10 reads out the first information and the second information from the storage section 9 to generate the reception signal. The controller 10 then generates a correspondence table T3 based on the reception signal. The second information indicates for example whether or not the operation section 2 has generated the operation signal within a short period of time (e.g., 10 seconds) after the reception of the detection signal by the controller 10. The controller 10 transmits the correspondence table T3 to the management server 200 via the communication section 8 for notification to the administrator. The routine proceeds to Step S317 depicted in FIG. 3.

Step S317: The controller 210 of the management server 200 determines whether or not to permit the instructed setting change according to administrator input. Specifically, the communication section 208 of the management server 200 first receives the correspondence table T3, and then transmits the correspondence table T3 to the controller 210. The controller 210 then causes the display of the touch panel 221 to display a third notification screen G3. The administrator determines whether or not to establish the instructed setting change of the motion sensor 11, while referencing the third notification screen G3, and inputs a result of the determination to the operation section 202. The third notification screen G3 will be described later with reference to FIG. 5B.

Upon receiving from the touch panel 221 an operation instruction indicating that pressing of a button for setting change permission (i.e., a Yes button illustrated in FIG. 5B) on the third notification screen G3 is detected (Yes in Step S317), the controller 210 of the management server 200 transmits the adjustment instruction to adjust the sensitivity level to the image forming apparatus 100 via the communication section 208. The controller 10 of the image forming apparatus 100 maintains the changed sensitivity level. The routine then proceeds to Step S319. Alternatively, when the controller 10 receives from the touch panel 221 an operation instruction indicating that pressing of a button for setting change cancellation (i.e., a NO button illustrated in FIG. 5B) is detected (No in Step S317), the routine proceeds to Step S321.

Step S319: The controller 10 sets a period within which the instructed setting change for the motion sensor 11 is permitted. Since the adjustment instruction to adjust the sensitivity level is received in Step S317, the current value of the sensitivity level set in the motion sensor 11 is determined as a value of the sensitivity level under final setting. The final setting is an example of "final adjustment" and is setting through which reversion of the current value of the sensitivity level to a value before adjustment is not permitted (i.e., change of the sensitivity level is established). In the embodiment of the present disclosure, change of the sensitivity level of the motion sensor 11 is restricted until a preset period (period during which adjustment of the sensitivity level is restricted) elapses. The preset period is for example 6 hours. Through execution of Step S311 to Step S319, excessive setting change can be inhibited.

Note that the period within which setting change is permitted is preset prior to execution of Step S319 in the embodiment of the present disclosure. However, the controller 210 of the management server 200 may transmit time information indicating the period within which adjustment of the sensitivity level is restricted to the image forming apparatus 100 via the communication section 208 in addition to the adjustment instruction in Step S317.

Step S321: The controller 210 of the management server 200 notifies the image forming apparatus 10) of non-permission of the instructed setting change. Specifically, the controller 210 transmits the adjustment instruction not to adjust the sensitivity level to the image forming apparatus 100 via the communication section 208. The routine proceeds to Step S323.

Step S323: The controller 10 returns setting of the sensitivity level to the value initially set at the start. Specifically, the controller 10 returns the current value of the sensitivity level that has been changed in Step S301 to the value of the sensitivity level before the first notification screen G1 is displayed. Then the routine returns to Step S301.

Step S325: Until a specific period (e.g., a preset time period) elapses, the controller 10 refuses to receive a user instruction for setting change for the motion sensor 11. After the preset period elapses, the routine returns to Step S301. Through execution of Step S301 to Step S325, the administrator can monitor an operating state of the motion sensor 11 of the image forming apparatus 100. Furthermore, the administrator can determine whether or not to establish the instructed setting change of the motion sensor 11, while taking account of balance between user convenience and power consumption.

Figure 4:
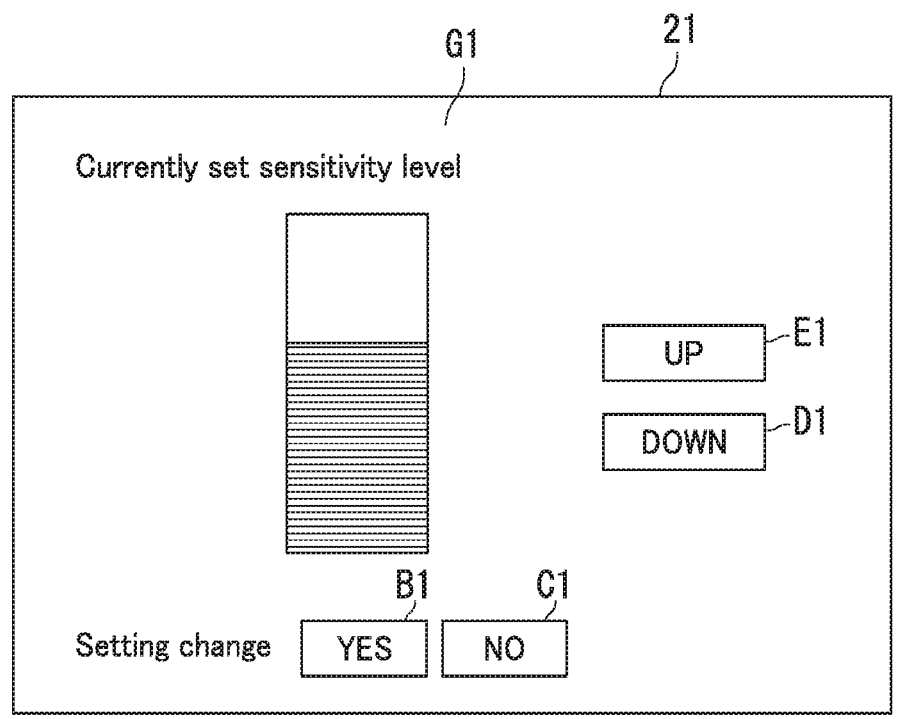
FIG. 4 is a diagram illustrating a display example in the image forming apparatus.

The following describes a display example (first notification screen G1) in the image forming apparatus 100 with reference to FIG. 4. FIG. 4 is a diagram illustrating the display example in the image forming apparatus 100. The controller 10 of the image forming apparatus 100 causes the display of the touch panel 21 to display the first notification screen G1.

As illustrated in FIG. 4, the first notification screen G1 includes a level meter indicating a currently set sensitivity level and four buttons relating to setting change for the motion sensor 11. The four buttons are a YES button B1, a NO button C, a DOWN button DI, and an UP button E1. The touch panel 21 detects pressing by the detection target at a location where any of the buttons are displayed, and transmits an operation instruction to the controller 10. Upon receiving an operation instruction according to detection of pressing of the DOWN button DI, the controller 10 decreases the sensitivity level of the motion sensor 11 and changes a level displayed at the level meter. Similarly, upon receiving an operation instruction according to detection of pressing of the UP button E1, the controller 10 increases the sensitivity level of the motion sensor 11 and changes the level displayed at the level meter.

For example, when the YES button B1 is pressed in Step S301 depicted in FIG. 2 in execution of setting change for the motion sensor 11, the routine proceeds to Step S303. When the NO button C1 is pressed in Step S301, the routine remains in Step S301.

Figure 5A:
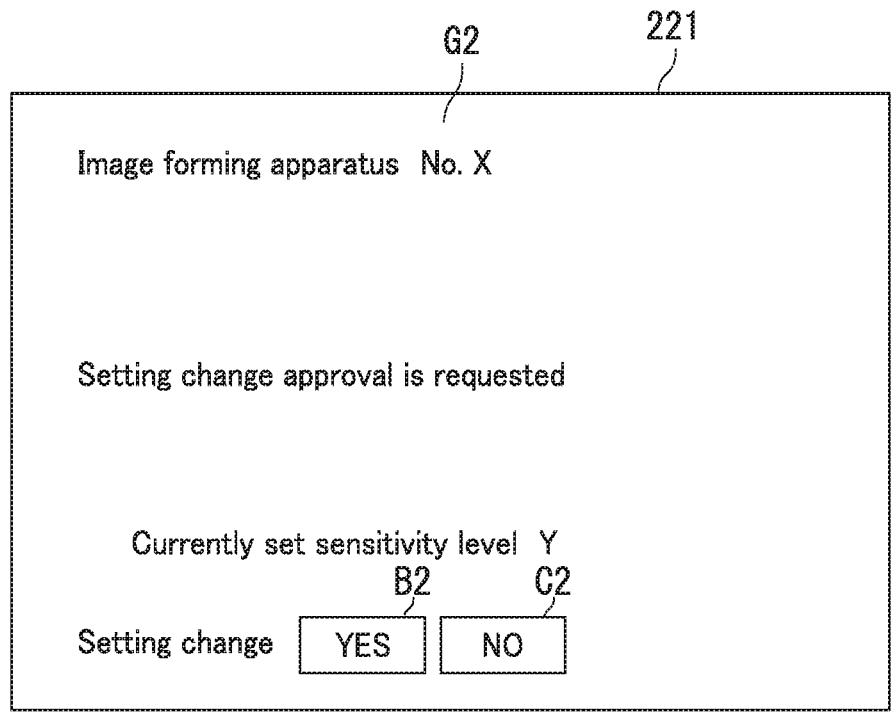
FIGS. 5A and 5B are diagrams each illustrating a display example in a management server.
Figure 5B:
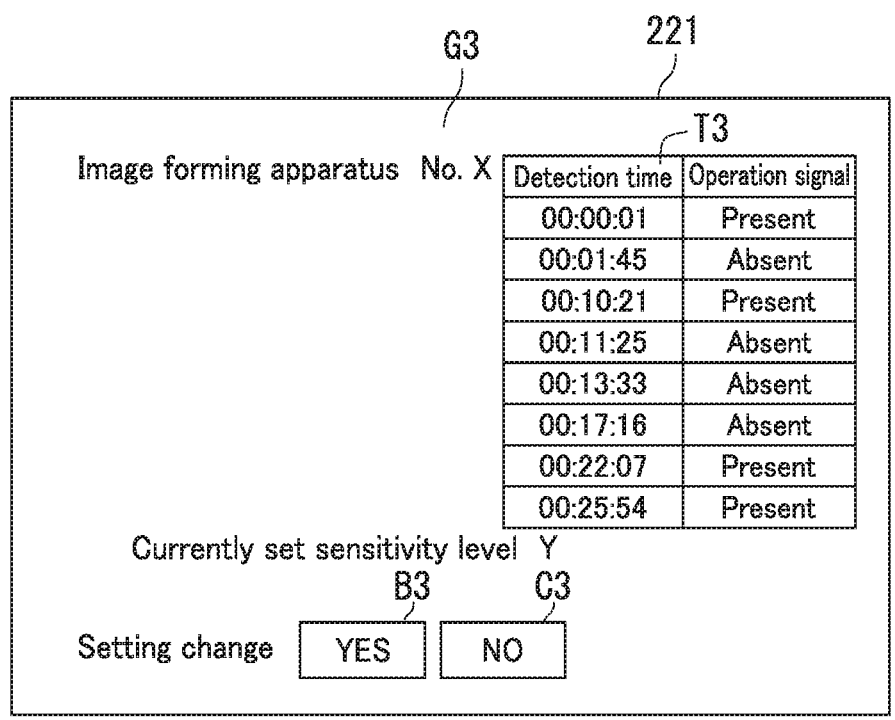

The following describes display examples (second notification screen G2 and third notification screen G3) in the management server 200 with reference to FIGS. 5A and 5B.

FIGS. 5A and 5B are diagrams illustrating the display examples in the management server 200. The controller 210 of the management server 200 causes the display of the touch panel 221 to display the second notification screen G2. As illustrated in FIG. 5A, the second notification screen G2 includes an area exhibiting "Image forming apparatus No. X", an area indicating "Setting change approval is requested", an area indicating "Currently set sensitivity level Y", and two buttons relating to setting change for the motion sensor 11. The two buttons are a YES button B2 and a NO button C2. The letter X in "Image forming apparatus No. X" represents a number for identifying the image forming apparatus 100 in which setting change has been done. The letter Y in "Currently set sensitivity level Y" represents a value indicating a currently set sensitivity level.

For example, when the YES button B2 is pressed in Step S307 depicted in FIG. 2 in execution of setting change for the motion sensor 11, the controller 210 of the management server 200 transmits the adjustment instruction to adjust the sensitivity level to the image forming apparatus 100 via the communication section 208. The controller 10 of the image forming apparatus 100 maintains the changed sensitivity level. The routine then proceeds to Step S311. When the NO button C2 is pressed in Step S307, the routine proceeds to Step S309.

The controller 210 of the management server 200 causes the display of the touch panel 221 to display the third notification screen G3. As illustrated in FIG. 5B, the third notification screen G3 includes an area indicating "Image forming apparatus No. X", an area indicating "Currently set sensitivity level Y", the correspondence table T3, and two buttons relating to setting change for the motion sensor 11. The two buttons are a YES button B3 and a NO button C3. The letter X in "Image forming apparatus No. X" represents a number for identifying the image forming apparatus 100 for which setting change has been done. The letter Y in "Currently set sensitivity level Y" represents a value indicating a currently set sensitivity level. In the correspondence table T3, the first information indicating time of detection signal reception by the controller 10 and the second information indicating the presence or absence of the operation signal within a short period (e.g., 10 seconds) from the time of the reception are recorded.

The following describes the content of the correspondence table T3. For example, the first detection time is 00:00:01 and the operation signal is "Present". The second detection time is 00:01:45 and the operation signal is "Absent". The above is an example of a situation in which a person who approached the image forming apparatus 100 at a time point of 00:00:01 carried out some operation on the image forming apparatus 100 and left the image forming apparatus 100 at a time point 00:01:45. The fifth detection time is 00:13:33 and the operation signal is "Absent". The above is an example of a situation in which a person passed in front of the image forming apparatus 100 without carrying out any operation on the image forming apparatus 100. As illustrated in FIG. 5B, the controller 10 receives the detection signal eight times within 30 minutes from the time 00:00:00 and receives the operation signal four times. The administrator determines whether or not to establish setting change of the motion sensor 11, while referencing the correspondence table T3.

For example, when the YES button B3 is pressed in Step S317 depicted in FIG. 3 in execution of setting change for the motion sensor 11, the controller 210 of the management server 200 transmits the adjustment instruction to adjust the sensitivity level to the image forming apparatus 100 via the communication section 208. The controller 10 of the image forming apparatus 100 maintains the changed sensitivity level. The routine then proceeds to Step S319. When the NO button C3 is pressed in Step S317, the routine proceeds to Step S321.

The image forming apparatus 100 and the management system 300 have been described so far with reference to the drawings (FIG. 1 to 5B). However, the present disclosure is not limited to the above-described embodiment and can be practiced in various ways within the scope not departing from the gist of the present disclosure. Configurations and numerical values described in the above embodiment are exemplary only and not particularly limited. The configurations and numerical values can be changed within a scope not substantially departing from the effects of the present disclosure.

Although the embodiment of the present disclosure is described using an example where the image forming apparatus 100 is a multifunction peripheral, the image forming apparatus 100 may for example be a copier or a printer.

Although the embodiment of the present disclosure is described using an example where the present disclosure is applied to the monochrome image forming apparatus 100, the present disclosure is applicable to for example a color image forming apparatus.

Although the embodiment of the present disclosure is described using an example where the present disclosure is applied to the electrographic image forming apparatus 100, the present disclosure is applicable to for example an inkjet image forming apparatus.

What is claimed is:

1. An image forming apparatus comprising:
   a sensor configured to detect a sensor target;
   an operation section configured to receive an operation instruction;
   a controller configured to adjust a sensitivity level of the sensor; and
   a communication section configured to transmit an instruction signal and a reception signal to an external device and receive an adjustment instruction from the external device, wherein
   the instruction signal indicates an instruction for sensitivity level adjustment for the sensor,
   the adjustment instruction is an instruction as to whether or not to adjust the sensitivity level based on the instruction signal and the reception signal,
   the reception signal includes first information and second information, the first information indicating time of detection signal reception by the controller within a specific period, the second information indicating whether or not the operation section receives the operation instruction,
   the detection signal indicates detection of the sensor target by the sensor,
   the controller adjusts the sensitivity level of the sensor according to the adjustment instruction, and
   the sensitivity level is a level of sensitivity for the sensor target.

2. The image forming apparatus according to claim 1, wherein
   adjustment of the sensitivity level of the sensor includes provisional adjustment and final adjustment, the provisional adjustment being adjustment in which reversion of the sensitivity level to a value before adjustment is permitted, the final adjustment being adjustment in which reversion of the sensitivity level to the value before the adjustment is not permitted.

3. The image forming apparatus according to claim 1, further comprising
a storage section that stores therein values of the sensitivity level of the sensor, wherein
after the controller adjusts the sensitivity level of the sensor, the controller stores a value of the sensitivity level after adjustment in the storage section, and
after the controller stores the value of the sensitivity level after the adjustment in the storage section, the controller changes the sensitivity level to a value before the adjustment.

4. The image forming apparatus according to claim 1, wherein
the controller restricts adjustment of the sensitivity level of the sensor for a specific period after adjustment of the sensitivity level of the sensor.

5. The image forming apparatus according to claim 1, wherein
the sensor is a motion sensor.

6. An management system comprising an image forming apparatus and a management server, wherein
the image forming apparatus includes:
  a sensor configured to detect a sensor target;
  a first operation section configured to receive an operation instruction;
  a first controller configured to adjust a sensitivity level of the sensor; and
  a first communication section configured to transmit an instruction signal and a reception signal to the management server and receive an adjustment instruction from the management server,
the instruction signal indicates an instruction for sensitivity level adjustment for the sensor,
  the adjustment instruction is an instruction as to whether or not to adjust the sensitivity level based on the instruction signal and the reception signal,
the reception signal includes first information and second information, the first information indicating time of detection signal reception by the controller within a specific period, the second information indicating whether or not the operation section receives the operation instruction,
the detection signal indicates detection of the sensor target by the sensor,
the first controller adjusts the sensitivity level of the sensor according to the adjustment instruction,
the sensitivity level is a level of sensitivity for the sensor target, and
the management server includes:
  a second communication section configured to receive the instruction signal and the reception signal from the image forming apparatus;
  a second operation section configured to receive input of the adjustment instruction in response to the reception signal; and
  a second controller configured to control the second communication section to transmit the adjustment instruction to the first communication section.

7. The management system according to claim 6, wherein
the management server transmits to the image forming apparatus time information indicating a period for which adjustment of the sensitivity level is restricted.

* * * * *